Patented Nov. 1, 1927.

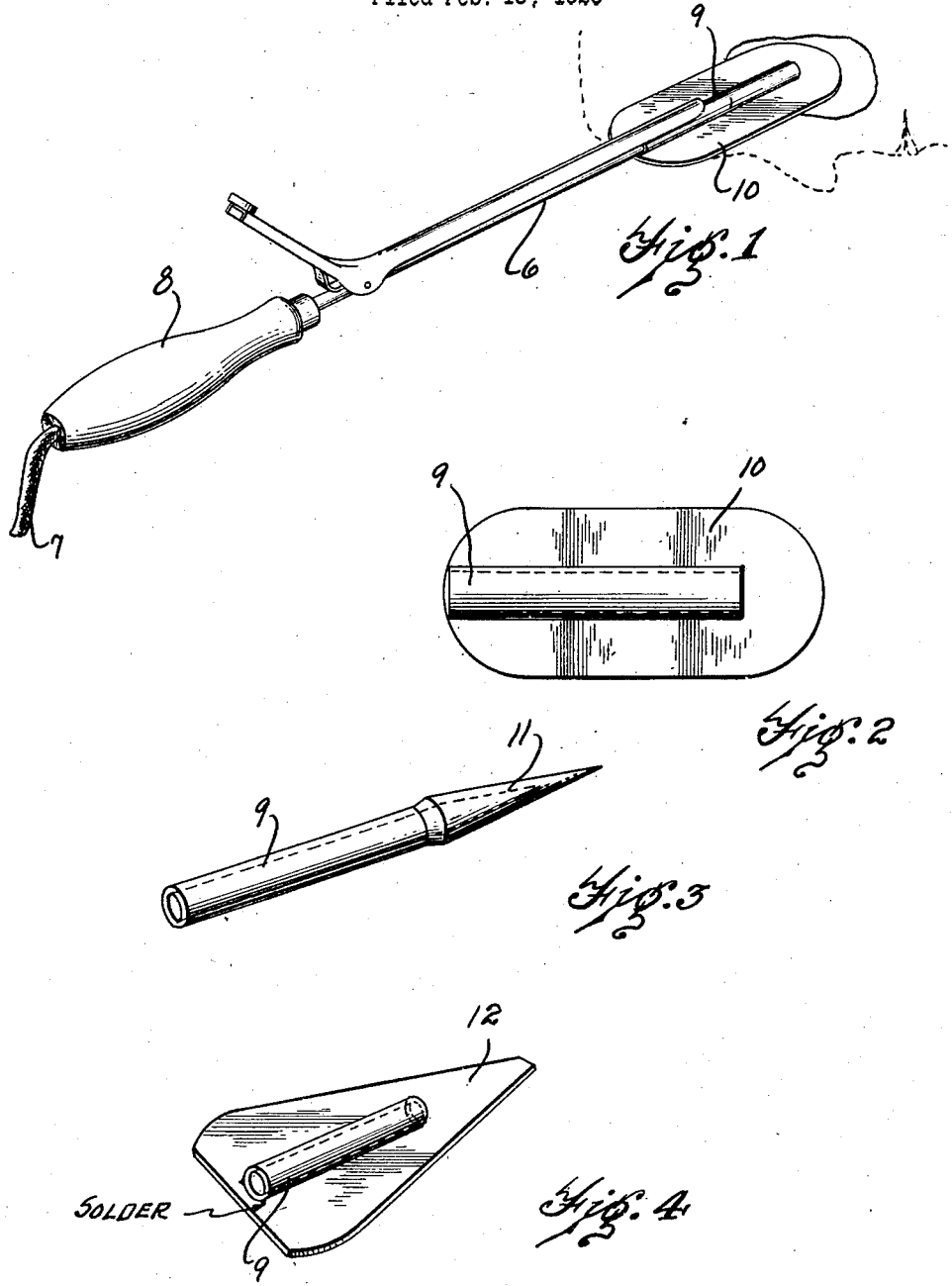

1,647,553

UNITED STATES PATENT OFFICE.

AUGUSTUS H. THOMPSON, OF ADDISON, MICHIGAN.

ATTACHMENT FOR ELECTRICAL HEATERS.

Application filed February 15, 1926. Serial No. 88,305.

This invention relates to attachments for electrical heaters whereby the application of wax and the like in plastic surgery may be facilitated.

The principal object of my invention is the provision of an applicator for plastic surgery that can be readily heated by a portable electric heater so that the applicator may be uniformly heated to the desired temperature.

A further object of my invention is the provision of an attachment for portable electric heaters whereby certain portions of the attachment may be heated to different temperatures from the remaining portions of the attachment, with means for readily adjusting the attachment upon the heater to vary the temperature of certain portions of the attachment at will.

Other objects and advantages will be apparent from the following description, wherein reference is made to the accompanying drawings illustrating preferred embodiments of my invention and wherein similar reference numerals designate similar parts throughout the several views.

In the drawings:

Fig. 1 is a perspective view of a preferred form of applicator attachment mounted upon a portable electric heater in position for use in plastic surgery.

Fig. 2 is a plan view of the attachment shown in Fig. 1 removed from the heater.

Fig. 3 is a perspective view of a different form of applicator attachment for use on the heater, and Fig. 4 is a perspective view of a further form of applicator attachment for use upon the heater.

Referring now to the drawings, the numeral 5 designates a portable electric heater of any desired size and contour, herein shown as comprising a barrel 6 containing an electrical heating element operated by current passing through the wires 7 leading through the hollow insulating handle 8. For purposes of exemplification I have illustrated a conventional form of portable electric heater known as a curling iron, but it is to be understood that my invention does not lie in the structure of the electric heater to be used therewith, but in the attachments to be used therewith, and, accordingly, any desired type of electrical heater may be employed in connection with my improved attachments.

The attachments forming the claimed disclosure herein comprise a sleeve 9 adapted to fit over the barrel 6 of the heater so that the sleeve may be moved along the barrel by manual pressure and will be frictionally held in any adjusted position upon the barrel. The applicator surface is suitably secured to the sleeve 9, as by soldering, welding, etc. Various shapes and sizes of applicator surfaces may be employed in connection with my invention, as for example a flat plate 10 with rounded ends, substantially as shown in Figs. 1 and 2, a conical roller or pencil 11 secured to one extremity of the sleeve, substantially as shown in Fig. 3, or a trowel-shaped blade 12, substantially as shown in Fig. 4. Each of these applicator shapes have their special use in plastic surgery, and without expatiating on their individual uses I desire to bring out clearly herein the fact that each of them can be conveniently heated to a desired temperature so that their working portions are maintained at such temperature during the entire period of use, and the temperatures at the working portions of the applicators may be varied at will.

The applicator blades 10 and 12 are formed with a surface materially greater than the surface of their attached sleeves 9 and the sleeves are arranged so that one of their extremities are substantially flush with one of the extremities of the applicator blades while their opposite extremities terminate short of the opposite extremities of the applicator blades. The lateral edges of the applicator blades may be equidistant from the sleeves or the sleeves may be arranged so that one of the side edges of the blade is at a greater distance from the sleeve than the other edge. By virtue of this arrangement various temperatures may be readily maintained at different portions of the applicator blades. For example when the applicator 10 is mounted upon the electrical heater with the free end of the heater barrel terminating about midway of the length of the sleeve 9, substantially as shown in dotted lines in Fig. 1, the rear portion of the applicator blade nearest the heater will be raised to a higher temperature than the rounded edge portion of the applicator at a distance from the extremity of the heater barrel. The front surface of the applicator blade, i. e., that at a distance from the extremity of the barrel is the ordinary working surface of the applicator, and it is essential that the operator be able to quickly secure the desired heat at the forward extremity of the applicator and then maintain this heat as long as the blade is in use. My construction is well adapted for this purpose, as the operator has simply to slip the sleeve 9 of the applicator along the heater barrel 6 until the correct position has been found to impart the desired degree of heat at the working edge of the applicator. It will be apparent that should a relatively high degree of heat be required at the forward extremity of the applicator blade the applicator may be applied to the heater barrel from the opposite end of the sleeve to that shown in Fig. 1. With this reversed position the free extremity of the heater barrel can be moved into close proximity with the working edge of the applicator blade, and none of the heat from the barrel is lost through radiation.

It will also be apparent that the applicator trowel blade shown in Fig. 4 is adapted to be mounted upon the heater barrel 6 from either extremity of its sleeve 9, as described in connection with the applicator blade 10.

The applicator shown in Fig. 3 consists of a hollow conical roller or pencil secured at its base to one extremity of its sleeve 9. This form of applicator is used for fine work, as around the eyes or mouth, and it is essential that the desired amount of heat at the working surface be maintained while it is being used. By sliding the sleeve 9 along the heater barrel to the desired extent, various degrees of heat from the barrel may be imparted to the tip of the roller 11.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claim.

Having described my invention, I claim:

An attachment for electrical heaters having a barrel comprising a sleeve adapted to be adjustably mounted upon the barrel, and an applicator fixed upon the sleeve and extending laterally and beyond the sleeve to provide working portions of the applicator heated to different degrees of temperature.

In witness whereof I hereunto set my hand.

AUGUSTUS H. THOMPSON.